(No Model.)
J. BOYD.
CULTIVATOR.
No. 547,624. Patented Oct. 8, 1895.
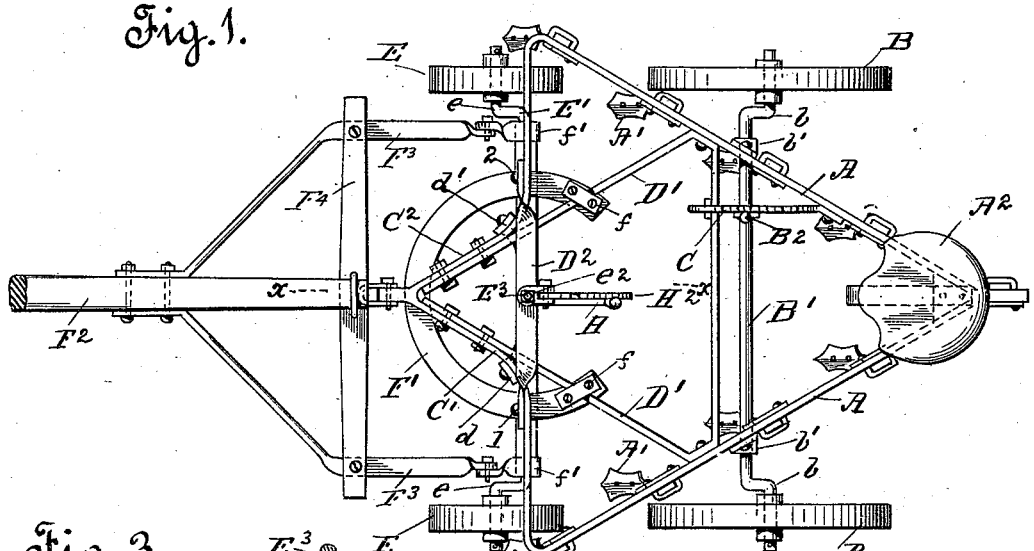
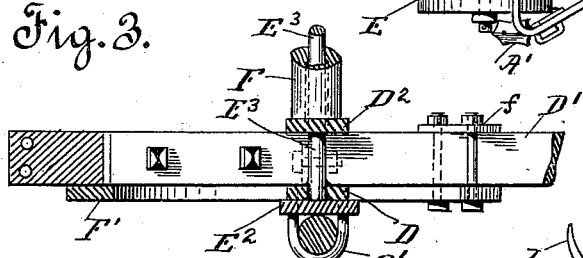
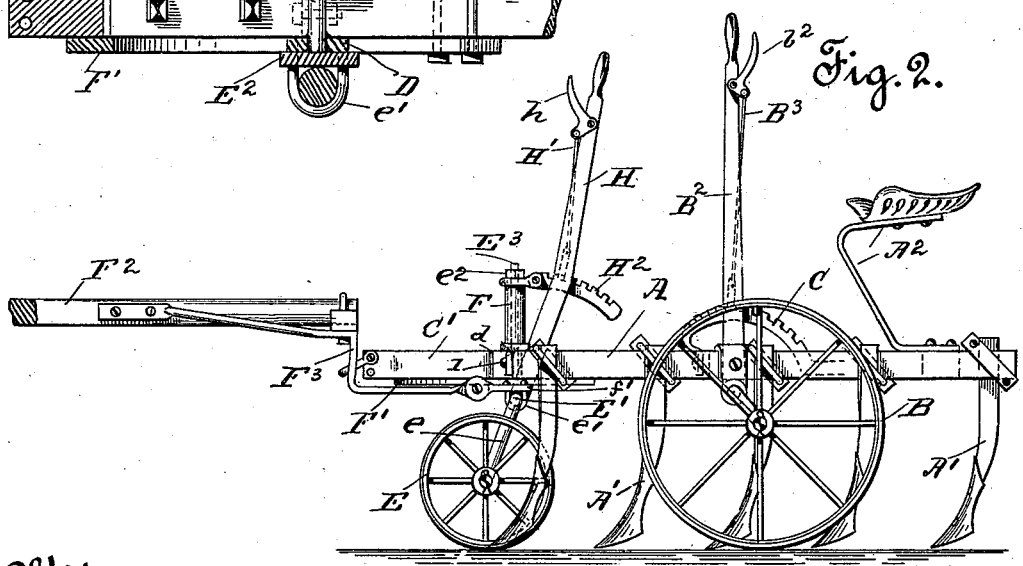
Witnesses.
F. Monteverd,
Elmer Wickes.
Inventor.
Joseph Boyd
by N. A. Acker,
Atty.

UNITED STATES PATENT OFFICE.

JOSEPH BOYD, OF CONCORD, CALIFORNIA.

CULTIVATOR.

SPECIFICATION forming part of Letters Patent No. 547,624, dated October 8, 1895.

Application filed April 26, 1895. Serial No. 547,248. (No model.)

*To all whom it may concern:*

Be it known that I, JOSEPH BOYD, a citizen of the United States, residing at Concord, in the county of Contra Costa and State of California, have invented certain new and useful Improvements in Cultivators; and I do hereby declare the following to be a full, clear, and exact description of said invention, such as will enable others skilled in the art to which it most nearly appertains to make, use, and practice the same.

This invention relates to a certain new and useful improvement in wheeled cultivators, which consists in the arrangement of parts and details of construction, as will be hereinafter fully set forth in the drawings, and described and pointed out in the specification.

The present invention is more especially designed for use in connection with the cultivation of the ground within an orchard, and the object thereof is to provide a cultivator which may be worked between and close to the trees of the orchard without danger of the cultivator doing damage to the trees, which often results by reason of the cultivator scraping against the trees during the travel thereof.

Heretofore in building cultivators with a triangular frame it has been customary to make the apex of the triangular frame the forward end thereof and the base of the frame the rear or drag end. Consequently, when the cultivator is doing work, it is nearly impossible for the driver, who is seated upon the machine, to gage exactly by the eye the necessary deviation to be made in the line of travel of the cultivator in order to clear a tree or stump, for the reason that, being seated in advance of the rear portion of the machine or base of the triangular frame, (the edge of which base of the frame projects considerably beyond the center of the apex of the frame,) he cannot watch the horses and the rear portion of the machine at the same time.

In order to fully understand my invention reference must be had to the accompanying sheet of drawings, forming a part of this application, wherein—

Figure 1 is a top plan view of the machine. Fig. 2 is a side view in elevation; and Fig. 3 is a broken detail view in side elevation on line $x$ $x$, Fig. 1.

The letter A indicates the triangular frame of the machine, and A' the cultivator-teeth secured or clamped to the sides of the frame. In my machine I so arrange the frame that the apex thereof will constitute the rear end of the machine and the base of the triangular frame the forward end of the machine, the base of the machine coming directly behind the horses. To the rear portion of this triangular frame I secure the seat $A^2$ of the driver.

The rear portion of the machine is supported above the ground by the wheels B, secured to the crank portion or ends $b$ of the axle B'. This axle is connected to the frame of the machine by means of the clips $b'$, bolted or otherwise secured to the frame. From the axle B' upwardly extends the hand-lever $B^2$, which lever is within reach of the operator of the machine, and as thrown back or forth causes the axle B' to turn within the clips $b'$, so as to throw the crank ends up or down in order to raise or lower the supporting-wheels B, so as to regulate the depth of cut to be given the cultivator-teeth. This hand-lever is provided with the catch-rod $B^3$, the lower end of which engages with the teeth of the quadrant C, bolted to the frame of the machine, Fig. 2, and serves to hold the lever locked at any desired position, said catch-rod being raised by the operator simply pressing upon the fulcrumed lever $b^2$, to which the upper end of the catch-rod is secured.

As will be noticed by reference to Fig. 1 of the drawings, the forward end portion of the triangular frame is bent or curved inward and then forward, and to the arms C' $C^2$ are connected the ends $d$ $d'$ of the supporting strap or plate D. The main or triangular frame is strengthened by the brace-frame D', which at its ends is bolted to the sides of the main frame and at its forward end to the arms C' $C^2$ of said frame. The apex or forward end of this brace-frame rests upon the supporting strap or plate D, which strap, being bolted to the main frame, as before described, prevents the spreading of the frame at its forward portion. Across the forward end portion of the brace-frame is run the plate or strap $D^2$, the ends of which are twisted and bolted to the base of the triangular main frame at the points $l^2$. The forward end of the brace-frame is thus located between the plates D $D^2$, which plates, while serving to strengthen the forward end of the triangular frame and prevent the spreading thereof, also serve as bearing-plates for holding the king-bolt, as hereinbefore described, in proper position.

The forward end of the triangular frame is supported above the ground by the supporting-wheels E, which wheels are less in diameter than the rear wheels and are secured upon the crank ends $e$ of the forward axle E′, the crank portions or ends of which axle are sufficiently long to raise the frame to a level with the rear portion. This forward axle is secured to the transverse bolster E² by clips $e'$, which bolster is in turn connected to the machine by the king-bolt E³, said bolt passing through the plates D and D′ and being held in place by the nut $e^2$, the thimble F being located between the plate D² and said nut, the king-bolt being free to turn.

The machine, as the bolster is swung around, is prevented from careening by means of the fifth-wheel F′, which is located between the bolster and the base of the triangular frame, being fastened to the side of the brace-frame by clips $f$.

The tongue F² is secured to the bolster E² by the hounds F³, which are connected by the brace F⁴. The inner ends of the hounds are secured to the projecting end of the clip-plate $f'$. As the tongue is thrown from side to side, the bolster E² is swung therewith, which carries the axle and causes the wheel to swing in an arc of a circle in the corresponding direction. The forward wheels are of such diameter as to permit of moving under the main frame of the machine as the tongue is thrown over.

From the forward axle upwardly projects the hand-lever H, which is bent backward, so as to be within convenient reach of the operator of the machine. This lever, as thrown forward or backward, serves to oscillate the axle E′ and throw the crank ends down or up, so as to raise or lower the forward end of the machine. To the lever is connected the catch-rod H′, the lower end of which engages, when lowered, within the teeth of the quadrant H², which is held in place upon the king-bolt by nut $e^2$. The catch-rod is raised or lowered by the fulcrumed hand-lever $h$, to which the upper end of the catch-rod is secured.

By constituting the base of the triangular frame the forward end of the machine the projecting ends of the machine will be in advance of the operator instead of in the rear, and the operator can determine how far to turn the horses to the right or left in order to cultivate around the trees without causing damage thereto, for the line the cultivators travel at its widest portion is always in advance of his eye.

Having thus described my invention, what I claim as new, and desire to secure protection in by Letters Patent, is—

In a cultivator, the combination of a substantially triangular frame, the front portion being bent in the form of a V to brace said frame, cultivator teeth secured to the rearwardly converging sides of the triangular frame, supporting wheels mounted on oscillatory axles, the brace frame secured within the main frame and having its front ends secured within the V-brace of the main frame, the upper and lower brace bars bolted to the front portion of the cultivator frame, the bolster to which the forward axle is secured arranged below the forward end of the triangular or main frame and connected thereto by a king bolt, and the fifth wheel located between the bolster and the triangular frame and secured to the brace bars by clips, substantially as specified.

In testimony whereof I affix my signature in presence of two witnesses.

JOSEPH BOYD.

Witnesses:
W. C. TAQUITT,
M. R. BRECKENRIDGE.